United States Patent
Bønding et al.

(10) Patent No.: US 10,294,921 B2
(45) Date of Patent: May 21, 2019

(54) SYSTEM FOR THRUST-LIMITING OF WIND TURBINES

(71) Applicant: Mita-Teknik A/S, Rødkærsbro (DK)

(72) Inventors: Jesper Bønding, Suldrup (DK); Martin Brorsen, Brande (DK)

(73) Assignee: Mita-Teknik A/S, Rødkærsbro (DK)

( * ) Notice: Subject to any disclaimer, the term of this patent is extended or adjusted under 35 U.S.C. 154(b) by 223 days.

(21) Appl. No.: 15/319,832

(22) PCT Filed: Jun. 8, 2015

(86) PCT No.: PCT/DK2015/050149
§ 371 (c)(1),
(2) Date: Dec. 19, 2016

(87) PCT Pub. No.: WO2015/192853
PCT Pub. Date: Dec. 23, 2015

(65) Prior Publication Data
US 2017/0152835 A1  Jun. 1, 2017

(30) Foreign Application Priority Data
Jun. 20, 2014 (DK) .................................. 2014 70369

(51) Int. Cl.
*G05B 19/048* (2006.01)
*F03D 7/02* (2006.01)
(Continued)

(52) U.S. Cl.
CPC ......... *F03D 7/0224* (2013.01); *F03D 7/0276* (2013.01); *F03D 7/042* (2013.01);
(Continued)

(58) Field of Classification Search
None
See application file for complete search history.

(56) References Cited

U.S. PATENT DOCUMENTS

2007/0018457 A1  1/2007  Llorente Gonzalez
2012/0087792 A1  4/2012  Cousineau
(Continued)

FOREIGN PATENT DOCUMENTS

| CN | 103026059 A | 4/2013 |
| EP | 2063110 A1 | 5/2009 |

(Continued)

*Primary Examiner* — Michael Lebentritt
(74) *Attorney, Agent, or Firm* — James Creighton Wray; Meera P. Narasimhan

(57) ABSTRACT

The present invention relates to a control system for thrust-limiting of wind turbines, which wind turbine comprises at least one tower, which tower carries at least one nacelle which nacelle comprises a rotating shaft, which shaft is rotated by one or more blades, which blades at pitch regulated by a pitch control system. It is the object of the present invention to reduce mechanical load and stress of a wind turbine. A further object is to reduce the maximal load on tower of a wind turbine. The thrust-limiting control system performs control of the pitch angle, which thrust-limiting control system performs regulation of the pitch angle based on at least a first input from a wind estimator and a second input from a turbulence estimator. By thrust-limiting control, reduction in the maximum mechanical load on a tower, or maybe also a nacelle, can be achieved by a relatively high percentage of the load in a way where it has only very limited influence on the power production of the wind turbine.

8 Claims, 2 Drawing Sheets

(51) Int. Cl.
*F03D 7/04* (2006.01)
*F03D 9/25* (2016.01)
*G05B 19/416* (2006.01)

(52) U.S. Cl.
CPC ............ *F03D 7/044* (2013.01); *F03D 7/045* (2013.01); *F03D 7/047* (2013.01); *F03D 9/25* (2016.05); *G05B 19/048* (2013.01); *G05B 19/416* (2013.01); *F05B 2200/11* (2013.01); *F05B 2200/12* (2013.01); *F05B 2220/706* (2013.01); *F05B 2240/14* (2013.01); *F05B 2240/221* (2013.01); *F05B 2240/912* (2013.01); *F05B 2260/70* (2013.01); *F05B 2260/71* (2013.01); *F05B 2260/74* (2013.01); *F05B 2270/101* (2013.01); *F05B 2270/1095* (2013.01); *F05B 2270/309* (2013.01); *F05B 2270/32* (2013.01); *F05B 2270/327* (2013.01); *F05B 2270/328* (2013.01); *F05B 2270/331* (2013.01); *F05B 2270/332* (2013.01); *F05B 2270/705* (2013.01); *G05B 2219/2619* (2013.01); *Y02E 10/723* (2013.01); *Y02E 10/725* (2013.01); *Y02E 10/728* (2013.01)

(56) References Cited

U.S. PATENT DOCUMENTS

| | | | |
|---|---|---|---|
| 2015/0167637 A1* | 6/2015 | Kooijman | F03D 7/02 416/1 |
| 2015/0292483 A1* | 10/2015 | Slack | F03D 7/0276 290/44 |
| 2016/0115941 A1* | 4/2016 | Marwaha | F03D 7/046 416/1 |
| 2016/0146190 A1* | 5/2016 | Ravindra | F03D 7/048 290/44 |
| 2016/0265509 A1* | 9/2016 | Movsichoff | F03D 1/06 |
| 2017/0321654 A1* | 11/2017 | Zheng | F03D 7/043 |

FOREIGN PATENT DOCUMENTS

| | | |
|---|---|---|
| EP | 2292928 A2 | 3/2011 |
| EP | 2565442 A1 | 3/2013 |
| EP | 2607689 A2 | 6/2013 |
| WO | 9842980 A1 | 10/1998 |
| WO | 2011042369 A2 | 4/2011 |

* cited by examiner

SYSTEM FOR THRUST-LIMITING OF WIND TURBINES

This application claims the benefit of Danish Application No. PA 0214 70369 filed Jun. 20, 2014, and PCT/DK2015/050149 filed Jun. 8, 2015, International Publication No. WO 2015/192853, which are hereby incorporated by reference in their entirety as if fully set forth herein.

FIELD OF THE INVENTION

The present invention relates to a control system for thrust-limiting of wind turbines, which wind turbine comprises at least one tower, which tower carries at least one nacelle which nacelle comprises a rotating shaft, which shaft is rotated by one or more blades, which blades are pitch regulated by a pitch control system.

BACKGROUND OF THE INVENTION

WO 2011/042369 discloses a method of controlling a wind turbine, where a control signal for a controllable parameter of the wind turbine is determined, and the rotor power coefficient, the torque coefficient, and/or a thrust coefficient of the wind turbine are estimated at time intervals. From this is determined a variation parameter reflecting the variation of the estimated rotor power, torque or thrust coefficient over time. The wind turbine is then controlled according to the control signal only if the variation parameter is above an alert threshold, and otherwise according to a modified control strategy. The control signal may have a power or torque reference signal for controlling the rotational speed of the turbine or a blade pitch reference signal. The modified control method may for instance entail stopping or de-rating the wind turbine. A control system configured to perform the above control method, and a wind turbine comprising such system are also disclosed. This document disclose page 5 line 9-30 "A control method based directly on the measured or estimated wind speed may similarly be inaccurate and unsuitable, as the controlling is then based on the wind speed in one point in space only and as changes to this parameter may not reflect similar changer in the overall wind speed".

OBJECT OF THE INVENTION

It is the object of the present invention to reduce mechanical load and stress of a wind turbine. A further object is to reduce the maximal load on tower of a wind turbine.

DESCRIPTION OF THE INVENTION

The object can be fulfilled by a system as disclosed in the preamble of claim 1 and further modified by a thrust-limiting control system that performs control of the pitch angle, which thrust-limiting control system performs regulation of the pitch angle based on at least a first input from a wind estimator and a second input from a turbulence estimator which first and second inputs are combined for forming an output (54) which is transmitted to a subtraction function where a signal representing the estimated thrust force is subtracted from the said signal, which subtraction function generates a further signal, which further signal is sent through a post-processing function for generating a signal for performing trust-limiting of the wind turbine.

By thrust-limiting control, reduction in the maximum mechanical load on a tower, blades, or maybe also a nacelle, can be achieved by a relatively high percentage of the load in a way by which it has only very limited influence on the power production of the wind turbine. By measurements and analyses of pitch-controlled wind turbines it has been found that the maximum load on the tower is not caused by maximum wind speed but instead in a regulation range where the pitch regulation starts to have influence on the power production. Typically, this happens in the range of 8-12 meters/second of wind velocity because with a wind stronger than this range, a down regulation of the power production is performed by regulating the pitch. By higher wind velocities, the pitch regulation is more or less perfectly controlling the load and no peak thrust load occurs, not even at maximum wind velocity which is typically 25 meters/second for wind turbines at which velocity a safety shutdown is performed. The thrust-limiting control is working highly efficiently because inputs of different parameters are possible. By a first possible embodiment of the invention, the thrust-limiting control system operates with data from a wind estimator which calculates the maximum wind speed in a given situation, and an input from a turbulence estimator, because maximum thrust will be achieved in a combination of load from these two parameters. By a relatively high wind speed and a high turbulence intensity, this turbulence will add positive and negative effects to the thrust. Therefore, by high turbulence activities, it is necessary to perform an efficient limitation of the thrust by regulating the pitch angle.

Of course, for thrust limitation, a high number of parameters can have influence for achieving the maximum effect where the thrust is reduced in a large number of different situations of operation. Not only is the tower stressed by maximum load, but also plates are highly affected by maximum thrust. By the present invention it is possible to perform a thrust clipping in a very small area of production and in that way achieve a very high reduction in the maximum thrust that is measured in the wind turbine. The system can be performed by various modes of operation, simply because by very weak load, there is no need for any thrust limitation, and also in the case of maximum load, the existing safety mechanisms will also provide for the thrust limitation. Therefore the present invention is highly efficient for mean ranges of wind speed.

By a further preferred embodiment of the invention the wind estimator can receive a third input from measurement of inter-blade mean pitch angle, which wind estimator receives a fourth input from a generator torque reference set by a torque controller, where the wind estimator receives a fifth input from a measured generator angular velocity. Hereby it can be achieved that further parameters from an operating wind turbine is used as input for the thrust-limiting system. It is obvious also to use data from e.g. the torque controller because such data exist in most wind turbines. Also the generator angular velocity is a parameter which already exists in control systems for wind turbines. Therefore, by combining these two critical parameters it can be achieved that the thrust-limiting system can be more effective.

By a further preferred embodiment for the invention a sixth input to the wind estimator can be derived from rotor inertia acceleration. Hereby the actual rotor inertia acceleration for a further parameter for thrust limiting of a wind turbine can be achieved.

By a further preferred embodiment of the invention can the turbulence estimator receives a sixth input from measured nacelle fore-aft acceleration. Hereby it can be achieved that further signals from accelerometers placed for example in the nacelle or maybe from accelerometers placed directly in the tower, can have influence on the thrust-limiting process.

By a further preferred embodiment of the invention the wind estimator can generate a first internal signal based on estimated rotor average wind speed, which first internal signal is transmitted to both the turbulence estimator and to the condition-adaptive thrust limiter system. By using the same input for different calculation modules it is possible for the system to further process the data and maybe also to reduce the influence of a data segment.

By a further preferred embodiment of the invention the thrust-limiting system can comprises at least the following operational activities such as a condition-adaptive thrust limiter feed forward function, which condition-adaptive thrust limiter feed forward function receives input from the first internal signal based on estimated rotor average wind speed and input from the measured generator angular velocity, which feed forward function has an output. By using feed forward regulation it is possible to speed up the process of regulation so that thrust limitation can be performed very rapidly after changes in parameters have been detected. Especially the combination of average wind speed and generator angular velocity gives parameters which need very fast operation if they change in a critical way.

By a further preferred embodiment of the invention the control system can further comprises a safe mode switch function, which safe mode switch function receives input that controls the thrust limit, which safe mode switch function further receives input from a turbulence scaled thrust limiter given by a turbulence detector, which safe mode switch function based on the inputs generates an output, which output is transmitted to the condition-adaptive thrust limiter feed forward function. Hereby it can be achieved that if an already existing safety switch is activated into a safe mode, this safe mode immediately has influence on the thrust-limiter feed forward function because rapid change of pitch angle could be necessary because the safety switch is activated. Therefore a reduction in thrust can be necessary.

By a further preferred embodiment of the invention the output can be transmitted to a subtraction function where a signal representing the estimated thrust force is subtracted from the signal, which subtraction function generates a signal, which signal is sent through a post-processing function for generating a signal. Hereby it can be achieved that different signals that are representing more or less the same parameters have a reduced influence on the regulation because their values are subtracted from each other.

By a further preferred embodiment of the invention the signal can be transmitted to a PID control function, which PID control function further receives input from the output from the feed forward function, which PID control function further receives input from measurement of inter-blade mean pitch angle, which PID control function generates an output. To this output, the signal for forming a signal representing the minimal pitch angle is added. Hereby it can be achieved that the signals are transmitted further to the PID regulation, and these signals are then the signals used directly for regulating the pitch angle. Hereby a highly efficient thrust-limiting system is achieved that processes a plurality of measured parameters in a wind turbine. All these input parameters are calculated internally; some in existing control modules, others are processed in the new thrust-limiting module. However, all in all, thrust-limiting of a wind turbine is achieved that is highly effective and which can reduce the extra load on both tower, nacelle and rotor.

The pending patent application further discloses a method adapted for thrust-limiting of wind turbines as disclosed in the previous description, whereby the method discloses at least the following steps of operation:

a. receive a first input from a wind estimator
b. receive a second input from a turbulence estimator,
c. combine first and second input signals for forming an output,
d. perform subtraction of a signal representing the estimated thrust from the output signal,
e. generates a signal, which signal is sent through a post-processing function for generating a signal for performing trust-limiting of the wind turbine.

Herby effective thrust limiting can be performed based on a number of measured parameters in the wind turbine; further parameters not disclosed in this patent application can be incorporated in the thrust-limiting method.

In the following a possible embodiment of the turbulence scaled condition-adaptive thrust limiter is described. The turbulence scaled condition-adaptive thrust limiter is a feature in the controller which constrains the minimum allowable pitch angle to limit maximum operating rotor thrust. There are several thrust-related external conditions which need to be load-alleviated before the blade design load can be reduced. This is the motivation of the condition-adaptive thrust limiter itself. However it will always be a load benefit to set this thrust limit low which will cause reduction in annual energy production (AEP). To some extent the resulting reduction of AEP is compensated by scaling the thrust limit on the basis of load indicators.

The turbine is equipped with a control system which governs the operation of the turbine (among these are pitch, power and speed). The behaviour of the controller in terms of pitch and power (operational strategy) governs the operating thrust on the rotor.

The turbine running at optimum power trajectory will experience a high and steep thrust peak near the rated operation. Some of the load on main components is primarily linked to rotor thrust, blade and tower in particular, therefore these components will be designed to survive extreme external events at this thrust peak. This link between peak thrust and loads on the components is the main motivation for developing thrust-limiting control features. In addition to extreme loads associated with high mean thrust, the steep peak of thrust will also impact the fatigue loads, especially for tower. This is due to the turbulence, which will drive the thrust across the thrust peak repeatedly thus causing excessive thrust fatigue loading.

To limit the maximum operating thrust, the control strategy is modified in a way by which the minimum allowable pitch angle is determined.

The condition-adaptive thrust limiter itself consists of several sub-functionalities:

Estimate the rotor wind using pitch, power rotor speed, rotor acceleration, rotor inertia,
Based on the rotor wind and the aerodynamic model of the rotor, the rotor thrust is estimated,
Based on the thrust estimate and the thrust limit (set by the turbulence scaling) a thrust error is calculated,
The thrust error is used in a PID controller which pitches the blade out when the estimated thrust is higher than the thrust limit set by the turbulence scaling,
The thrust estimate is also used in a feed forward functionality which based on the aerodynamic model calculates the expected pitch angle which keeps the thrust estimate below the limit set by the turbulence scaling.

The condition-adaptive thrust limiter outlined above will be able to constrain the maximum operating thrust. High frequency turbulence-driven fluctuations of the rotor thrust above the limit will not be fully removed. This thrust-limiting control method is scaled depending on an estimate of the present turbulence level. This allows for the condition-adaptive thrust limiter to have a low thrust limit in high turbulence situations and high thrust limit in low turbulence. The gain of this behaviour is increased power production in low turbulence compared to the condition-adaptive thrust limiter without turbulence scaling. The scaling must be effected in such that the extreme loads are still kept in control during low turbulence situations where the mean thrust is increased with the scaling.

The scaling consists of:
Estimating the rotor wind using pitch, power and rotor speed and knowledge of the rotor aerodynamics and losses in the system
Measuring the nacelle fore-aft acceleration in the tower top In order to evaluate the turbine operating conditions the applied wind force on the rotor must be known. This is obtained by a wind estimator estimating the rotor average wind speed, leading to a reliable "measurement" of the wind, compared to a hub height anemometer. This estimated rotor average wind speed will be fed to both a turbine thrust estimate, used for thrust-limiting control, and the turbulence estimation for scaling the applied thrust limit, depending on the turbine operating wind turbulence conditions.

Different designs of a wind estimator are possible. The general idea of the wind estimator is to use a model of the aerodynamic behaviour of the rotor to estimate a representative wind speed of the wind passing through the rotor. This is done using knowledge of the main operational parameters in the turbine pitch, power and rotor speed.

At least the following parameters can be used for the wind estimator:

1. Yaw error sensitivity. Because the wind estimator 'senses' the resulting/representative wind based on pitch, power and rotor speed it will not be able to distinguish low wind from operation in high yaw error.

2. Aerodynamic change sensitivity. Because of the heavy use of aerodynamic model to estimate the wind, the estimator will be sensitive towards changes in the model. Such changes can origin from various sources including icing, dirt, pitch errors or other phenomena changing the characteristics of the rotor.

3. Density dependency. The rotor power/torque is linearly proportional to the air density. This is currently included as a parameter in the wind estimator, but it is straightforward to include this as an input. The challenge is then to estimate the air density accurately. The sensitivity towards the air density is quite high, according to an environmentally changing variable. The only other parameter changing over time is due to ice on blades, wear and tear, etc. This can be mitigated by including an air density measurement in the combined control system.

DETAILED DESCRIPTION OF THE INVENTION

Figure 1:
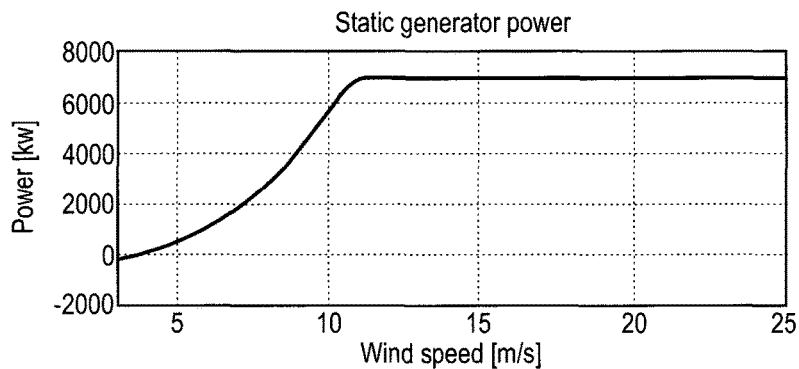
FIG. 1 shows a curvature concerning static generator power.

FIG. 1 shows one possible curvature indicating wind speed versus power. At the curvature, it can be seen that invention as disclosed hereafter has very limited influence on the power generated. Only in a very small window of wind speed are there any changes. It is indicated that the thrust limitation system will only reduce the power production in this very limited area, and here the influence is less than 1 percent of the power production.

Figure 2:
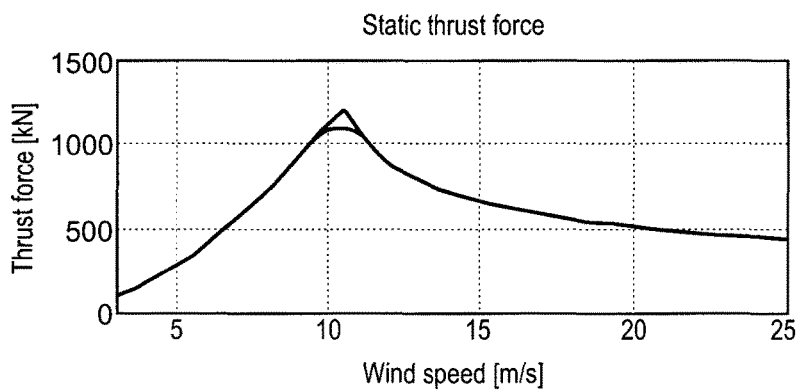
FIG. 2 shows a curvature showing static thrust force.

FIG. 2 indicates instead wind speed vs. thrust force. The two curves indicate that the maximum thrust force is achieved by a wind speed of just above 10 meters/second. The upper curve indicates a peak which is reduced by the lower curve. The lower curve indicates active thrust limitation because the pitch has additional advantages, such as reaction speed and turning options with only few secondary load changes. The reaction time is a motivation for thrust-limiting control features so as to reduce the thrust peak, and to reduce the load associated with extreme external events. Because of the reaction time, the slight change in the pitch to reduce the thrust is having only very limited influence on the power production of the system as such. Therefore, the thrust limitation is performed with only very small changes in the power production, but because the thrust limitation is performed in an area where the wind turbine typically operates most of the time, viz. in the range of app. 10 meters/second, the thrust limitation can have major influence on the total load on for example a tower or maybe also the whole rotor system. In this way, mechanical stress on the tower and maybe also the blades is reduced.

Figure 3:
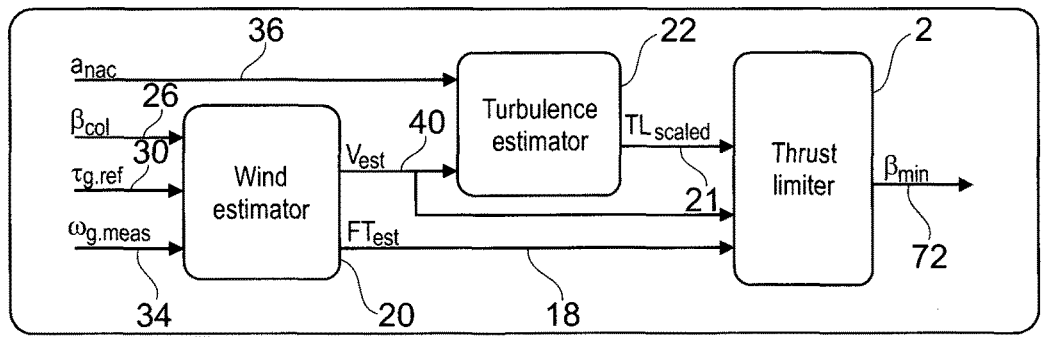
FIG. 3 shows a block diagram comprising a thrust-limiting function.

FIG. 3 indicates a system comprising a thrust-limiting function 2. This limiting function receives a first input 18 from a wind estimator 20. A second input 21 is generated by a turbulence estimator 22. The signal 21 controls the level for power reduction and thrust reduction. This wind estimator 20 has a first input 26 based on measurement of inter-blade mean pitch angle. Further, the wind estimator 20 receives input 30 from a generator torque reference. Further the wind estimator 20 receives input 34 from measured generator angular velocity. The wind estimator 20 generates an output 40 sent to the turbulence estimator 22 and directly to the condition-adaptive thrust limiter 2. The turbulence estimator 22 receives an input 36 based on measured nacelle fore-aft acceleration.

As can be seen from FIG. 3, there is a plurality of signal inputs that are used as inputs for wind estimator 20 and turbulence estimator 22 which are used for the condition-adaptive thrust limiter which condition-adaptive thrust limiter has an output 27 which is the signal that controls the actual pitch position.

Figure 4:
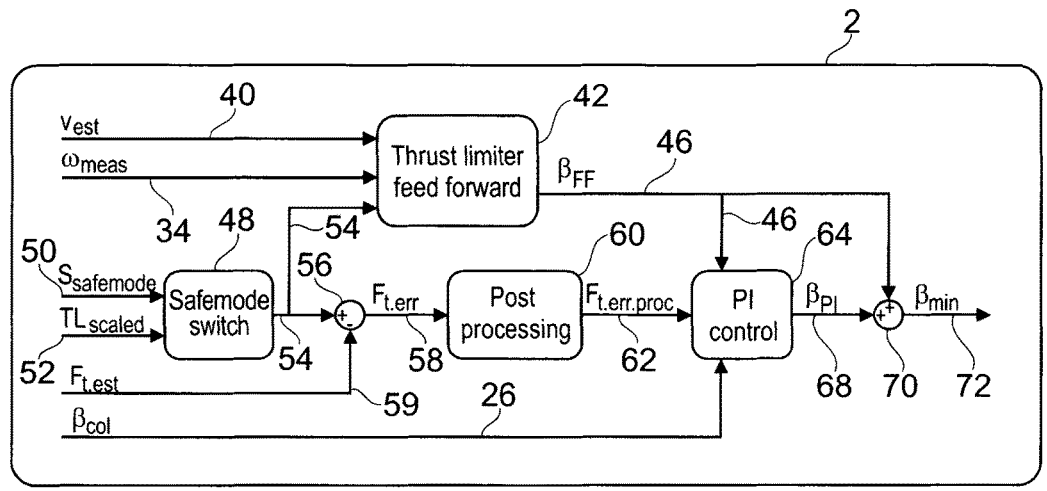
FIG. 4 shows a block diagram indicating a possible disclosure of a thrust-limiting function.

FIG. 4 shows a more detailed disclosure of the condition-adaptive thrust limiter 2. The condition-adaptive thrust limiter 2 comprises at least a condition-adaptive thrust limiter feed forward function 42, a soft safety switch 48, a post-processing procedure 60 and a PI control 64. The condition-adaptive thrust limiter receives an input 40 generated by the wind estimator 20 which can be seen in FIG. 3. Further, the condition-adaptive thrust limiter feed forward function 42 receives another input 34 representing measured generator angular velocity. Further the safe mode switch 48 can have a first input 50 which input can control the thrust limitation function. In this way it is possible to activate or de-activate the thrust-limiting system from an external control. Further the safe mode switch receives an input 52 from a turbulence-scaled condition-adaptive thrust limiter given by a turbulence detector. The safe mode switch 48 has an output 54 which at first is transmitted to the condition-adaptive thrust limiter feed forward function 42, and further to subtraction function 56. Here a signal 59 represents the estimated thrust force subtracted from the signal 54 coming from the safe mode switch 48. Hereby a new signal 58 is generated which is transmitted to a post-processing module 60. This module generates a signal 62. This signal is sent to a PI control 64. This PI control further receives an input 46 which is generated by a condition-adaptive thrust limiter feed forward module 42. Further, a signal 26 is representing the measurement of inter-blade mean pitch angle also sent to the PI control. The PI control has an output 68 which is sent to an adder 70 where the signal 46 generated by the condition-adaptive thrust limiter feed forward module 42 is added to the signal 46 generating the output signal for controlling the pitch position 72.

Figure 5:
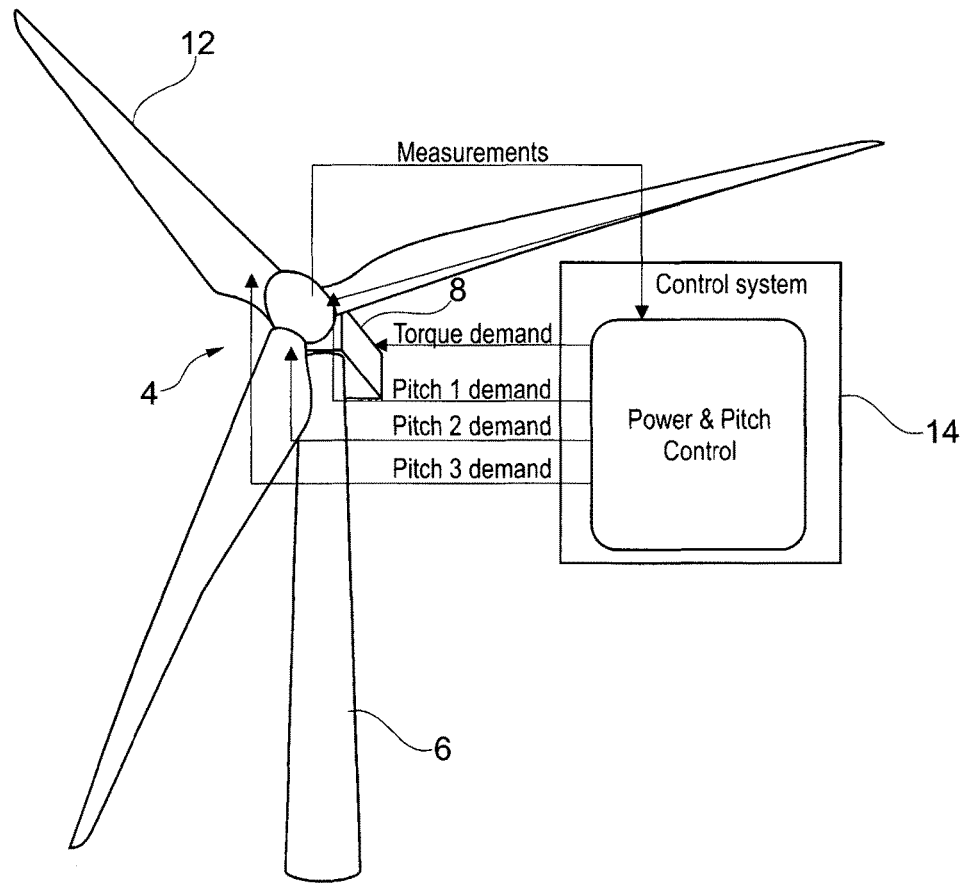
FIG. 5 shows a wind turbine.

FIG. 5 shows a wind turbine 4 comprising a tower 6, a nacelle 8, and rotor with blades 12. Further, a power and pitch control system 14 is indicated.

By the present invention it is possible to reduce the maximum thrust, both at the tower 6 and at the rotating system 12. The advantage of the present invention is that this reduction of thrust can be performed.

The invention claimed is:

1. Control system for thrust-limiting of wind turbines, which wind turbine comprises at least one tower, which tower carries at least one nacelle which nacelle comprises a rotating shaft, which shaft is rotated by one or more blades, which blades are configured to be pitch regulated by a pitch control system, whereby the thrust-limiting control system performs control of the pitch angle, which thrust-limiting control system performs regulation of the pitch angle based on at least a first input from a wind estimator and a second input from a turbulence estimator, which first and second inputs are combined for forming an output which output is transmitted to a subtraction function where a signal representing the estimated thrust force is subtracted from the signal, which subtraction function generates a signal, which signal is sent through a post-processing function for generating a signal for performing thrust-limiting of the wind turbine, whereby the wind estimator receives a third input from measurement of inter-blade mean pitch angle, the wind estimator receives a fourth input from a generator torque reference set by a torque controller, and the wind estimator receives a fifth input from a measured generator angular velocity.

2. Control system for thrust-limiting of wind turbines, which wind turbine comprises at least one tower, which tower carries at least one nacelle which nacelle comprises a rotating shaft, which shaft is rotated by one or more blades, which blades are configured to be pitch regulated by a pitch control system, whereby the thrust-limiting control system performs control of the pitch angle, which thrust-limiting control system performs regulation of the pitch angle based on at least a first input from a wind estimator and a second input from a turbulence estimator, which first and second inputs are combined for forming an output which output is transmitted to a subtraction function where a signal representing the estimated thrust force is subtracted from the signal, which subtraction function generates a signal, which signal is sent through a post-processing function for generating a signal for performing thrust-limiting of the wind turbine, whereby the wind estimator receives a third input from measurement of inter-blade mean pitch angle, which wind estimator receives a fourth input from a generator torque reference set by a torque controller, which wind estimator receives a fifth input from a measured generator angular velocity, and whereby a sixth input to the wind estimator is derived from rotor inertia acceleration.

3. Control system for thrust-limiting of wind turbines according to claim 2, whereby the turbulence estimator receives a seventh input from measured nacelle fore-aft acceleration.

4. Control system for thrust-limiting of wind turbines according to claim 3, whereby the wind estimator generates a first internal signal based on estimated rotor average wind speed, which first internal signal is transmitted to both the turbulence estimator and to the condition-adaptive thrust limiter system.

5. Control system for thrust-limiting of wind turbines according to claim 4, whereby the thrust-limiting system comprises at least the following operational activities such as a condition-adaptive thrust limiter feed forward function, which condition-adaptive thrust limiter feed forward function receives input from the first internal signal based on estimated rotor average wind speed and input from the measured generator angular velocity, which feed forward function has an output.

6. Control system for thrust-limiting of wind turbines according to claim 5, whereby the control system further comprises a safe mode switch function, which safe mode switch function receives input that controls the thrust limit, which safe mode switch function further receives input from a turbulence scaled thrust limiter given by a turbulence detector, which safe mode switch function based on the inputs generates an output, which output is transmitted to the condition-adaptive thrust limiter feed forward function.

7. Control system for thrust-limiting of wind turbines, which wind turbine comprises at least one tower, which tower carries at least one nacelle which nacelle comprises a rotating shaft, which shaft is rotated by one or more blades, which blades are configured to be pitch regulated by a pitch control system, whereby the thrust-limiting control system performs control of the pitch angle, which thrust-limiting control system performs regulation of the pitch angle based on at least a first input from a wind estimator and a second input from a turbulence estimator, which first and second inputs are combined for forming an output which output is transmitted to a subtraction function where a signal representing the estimated thrust force is subtracted from the signal, which subtraction function generates a signal, which signal is sent through a post-processing function for generating a signal for performing thrust-limiting of the wind turbine, whereby the signal is transmitted to a PI control function, which PI control function further receives input from the output from the feed forward function, which PI control function further receives input from measurement of inter-blade mean pitch angle, which PI control function generates an output to which output the signal is added for forming a signal representing the minimal pitch angle.

8. Method adapted for thrust-limiting of wind turbines as disclosed in claim 7, whereby at least the following steps of operation:
   a. receive a first input from a wind estimator,
   b. receive a second input from a turbulence estimator,
   c. let the wind estimator receive a third input from measurement of inter-blade mean pitch angle,
   d. let the wind estimator receive a fourth input from a generator torque reference set by a torque controller,
   e. let the wind estimator receive a fifth input from measured generator angular velocity,
   f. combine the first and second input for forming an output,
   g. perform subtraction of a signal representing estimated thrust from the output, i. generates a signal, which signal is sent through a post-processing function for generating a signal for performing thrust-limiting of the wind turbine.

\* \* \* \* \*